United States Patent [19]
Casarella et al.

[11] Patent Number: 5,431,011
[45] Date of Patent: Jul. 11, 1995

[54] CATALYTIC CONVERTER DIAGNOSTIC

[75] Inventors: Mark V. Casarella, Fenton; James R. Yurgil, Livonia; David R. Wade, Waterford, all of Mich.; Gary A. Kleinfelder, Mercer, Pa.; Kurt A. Wellenkotter, Rochester Hills; John F. Vangilder, Webberville, both of Mich.

[73] Assignee: General Motors Corporation, Detroit, Mich.

[21] Appl. No.: 166,978

[22] Filed: Dec. 14, 1993

[51] Int. Cl.⁶ .............................................. F01N 3/20
[52] U.S. Cl. ....................................... 60/274; 60/276; 60/277; 73/118.1
[58] Field of Search .......................... 60/274, 277, 276; 73/118.1

[56] References Cited

U.S. PATENT DOCUMENTS 5,255,515 10/1993 Blumenstock ......................... 60/277

OTHER PUBLICATIONS

SAE Paper 900062–Detection of Catalyst Performance Loss Using On–Board Diagnostics–Clemmens et al–Feb 26–Mar. 2, 1990.

SAE Paper 910561–Detection of Catalyst Failure On–Vehicle Using The Dual Oxygen Sensor Method–Koupal et al–Feb. 25–Mar. 1, 1991.

*Primary Examiner*—Douglas Hart
*Attorney, Agent, or Firm*—Michael J. Bridges

[57] ABSTRACT

A diagnostic for an internal combustion engine exhaust gas treatment means includes a series of enabling conditions for modelling temperature and operational stability of the treatment means and includes first and second stage tests alternately applied on an engine air/fuel ratio cycle-by-cycle basis in accord with the diagnosed performance of the treatment means using post-converter oxygen sensor information. When the treatment means performance is diagnosed as being degraded close to a failed condition, the first stage is disabled and the more statistically rigorous second stage is activated to closely scrutinize converter performance using a two phase approach for false alarm protection.

12 Claims, 10 Drawing Sheets

CATALYTIC CONVERTER DIAGNOSTIC

FIELD OF THE INVENTION

The present invention relates to automotive vehicle diagnostics and, more particularly, to diagnostics for exhaust systems of internal combustion engines.

BACKGROUND OF THE INVENTION

The emissions benefit in catalytically treating internal combustion engine exhaust gas, such as by passing the exhaust gas through a catalytic converter is generally accepted. The catalytic treatment process involves a chemical reaction including the storage and release of oxygen derived from the addition of known base metals to a wash coat of the converter substrate. As a catalytic converter ages, its capacity to react with engine emissions in the storage and release process may deteriorate, reducing conversion performance. Such performance may degrade to the extent that the converter no longer provides adequate reduction in engine emissions.

It has been proposed that the oxygen storage and release capacity of conventional catalytic converters may be monitored to diagnose the performance of the converter. Such monitoring has included placement of a conventional oxygen sensing element in the engine exhaust gas path in position to sense the oxygen content in catalytically treated exhaust gas. This post-converter oxygen sensor has been applied in a diagnostic described in Society of Automotive Engineers SAE paper Nos. 900062 and 910561, wherein the amplitude content of the post-converter oxygen sensor has been analyzed via an "area ratio method." This method compares the area under an envelope defined by the post-converter oxygen sensor output amplitude over a predetermined period of time to a similar area defined for a pre-converter oxygen sensor.

Such diagnostic does not account for the inherent significant variation in the area under such envelopes. As such, the diagnostic is prone to misdiagnosis of converter performance, which may result in an inconvenient and costly catalytic converter replacement, or extension of a period of increased vehicle emissions. Accordingly, what is needed is a catalytic converter diagnostic that accurately characterizes catalytic converter performance.

SUMMARY OF THE INVENTION

The present invention addresses the need unresolved by the prior art through a catalytic converter diagnostic that accounts for the significant variation that is typical in measurement of the oxygen content in engine exhaust gas, such as through a statistical, hierarchical analysis of converter performance information.

Specifically, an aspect of the invention provides for oxygen sensor data gathering during sustained stable vehicle operating periods, to ensure the data accurately indicates converter performance. Further, the data is gathered selectively on a cycle-by-cycle basis, wherein any unsuitable cycle of data is discarded to prevent it from polluting the analysis.

In a further aspect of the invention, once a sufficient number of cycles of data are gathered, a sophisticated statistical analysis over a large sample base is available to analyze a maximum rate of change in post-converter oxygen sensor values over a given cycle. The maximum rate of change during a cycle indicates the remaining storage and release capacity of the converter.

The sophisticated analysis over the large sample base is made practical by not applying it until less rigorous approaches have diagnosed the converter to have started to degrade close to a condition warranting such rigorous scrutiny. Accordingly, precision is applied only when needed, for example to avoid inaccurate diagnoses when close to a failed condition, and is not applied when less rigorous data analysis approaches will suffice.

In yet a further aspect of this invention, once a failure is diagnosed, a check is made to determine whether the failure resulted from a mere transient degradation and not from a terminal converter condition which may require converter replacement.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
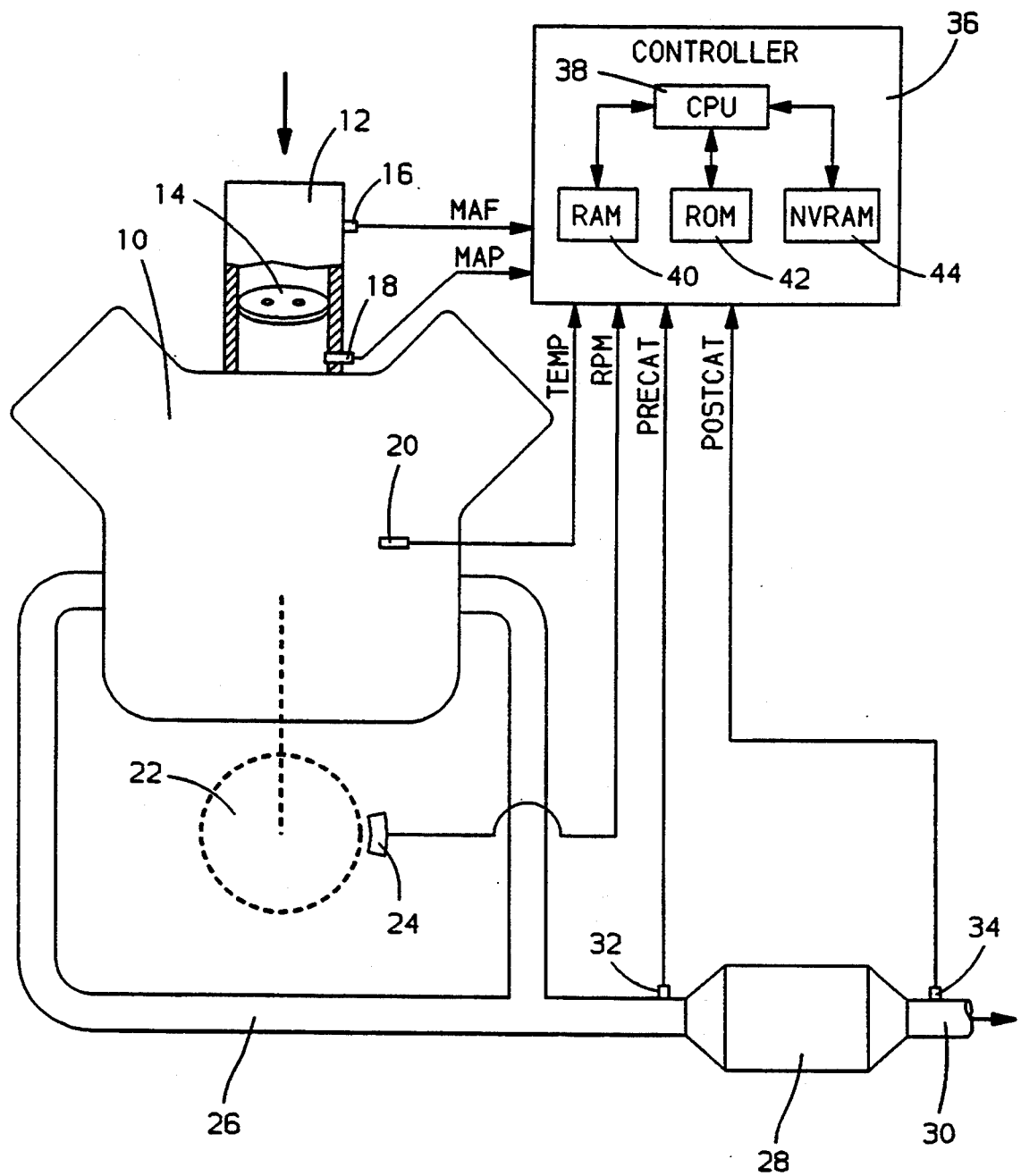
FIG. 1 is a general diagram of the engine and engine diagnostic hardware used in accord with the diagnostic of the preferred embodiment of this invention.

Referring to FIG. 1, inlet air is provided to internal combustion engine 10 through inlet air path formed by air conduit 12. An air metering means 14, such as a conventional butterfly valve is provided in the inlet air path above which is located a commercial mass airflow measuring means 16 for estimating mass airflow into the engine 10 and providing an output signal MAF indicative thereof. Air passing through inlet air path enters an engine intake manifold (not shown) in which is disposed an air pressure sensor 18 for transducing absolute pressure of air in proximity thereto, and providing an output signal MAP indicative thereof.

A conventional coolant temperature sensor 20, such as a thermocouple or thermistor is located in an engine coolant circulation path (not shown) to measure the temperature of the coolant passing by the sensor and to output a signal TEMP indicative thereof. An engine output shaft 22, such as a crankshaft, rotates through operation of the engine 10 at a rotational rate proportional to engine speed. Appendages (not shown), disposed about the circumference of the shaft 22, pass in proximity to a sensor 24, such as a conventional variable reluctance sensor, positioned to sense passage of the teeth and output a periodic signal RPM the frequency of which is proportional to engine speed.

The inlet air is combined with inlet fuel and the air/fuel mixture combusted in the engine 10 through engine operation, and a substantial portion of the combustion products are drawn out of the engine via exhaust gas conduit 26 to conventional catalytic converter 28 for catalytic treatment therein. The treated exhaust gas then passes out of the converter 28 via exhaust gas conduit 30. A pre-converter exhaust gas oxygen sensor 32 is disposed in exhaust gas conduit 26 in position to sense the oxygen content of the engine exhaust gas before treatment thereof by the converter 28, and to output a signal PRECAT indicative thereof. A post-converter exhaust gas oxygen sensor 34 is located in exhaust gas conduit 30 in position to sense the oxygen content of the engine exhaust gas after treatment thereof by the converter 28, and to output a signal POSTCAT indicative thereof.

An engine controller 36, such as a single chip microcontroller, includes such well-known elements as a central processing unit CPU 38, random access memory RAM 40, read only memory ROM 42, and non-volatile random access memory NVRAM 44. The controller, in a manner well-established in engine control, when activated through application of engine ignition power thereto, processes engine control and diagnostic routines, such as through execution of step-by-step program instructions stored in ROM 42. The instructions provide for the processing of input signals indicative of the state of engine operating parameters, and for the generation of control commands applied to various generally known engine control actuators.

Beyond such conventional engine control and diagnostic routines, additional operations are carried out by controller 36 in accord with this embodiment. Such additional operations may be included as step-by-step controller instructions as illustrated in FIGS. 2-8. The routines incorporating such instructions are executed periodically while the controller 36 is operating, such as approximately every 12.5 milliseconds while ignition power is applied to the controller 36. The routines are called as part of service routines for a conventional controller interrupt, such as a software interrupt set up through conventional controller initialization to occur about every 12.5 milliseconds.

Upon occurrence of the interrupt, CPU 38 attention is vectored from any lower priority CPU operations that are currently underway to the interrupt service routine illustrated in FIG. 2, which may execute the routines of FIGS. 3-8, as will be described. Upon completion of the routine of FIG. 2, CPU 38 attention returns the interrupted operations.

Figure 2:
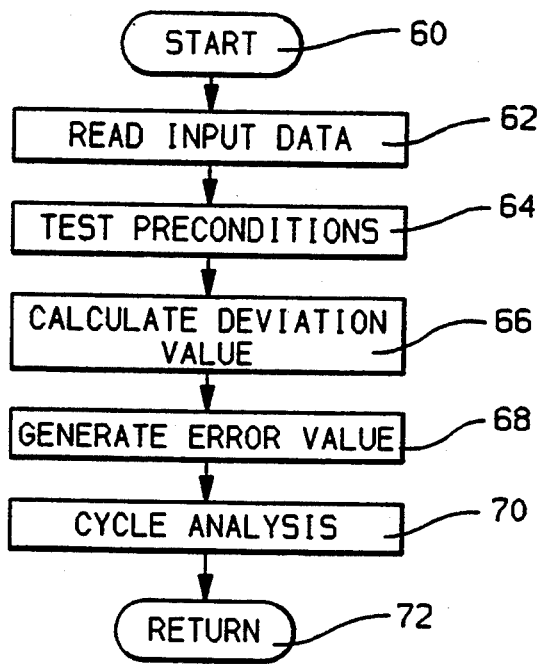
FIGS. 2–8 are computer flow diagrams illustrating the steps used to carry out this invention in accord with the preferred embodiment.
Figure 3A:
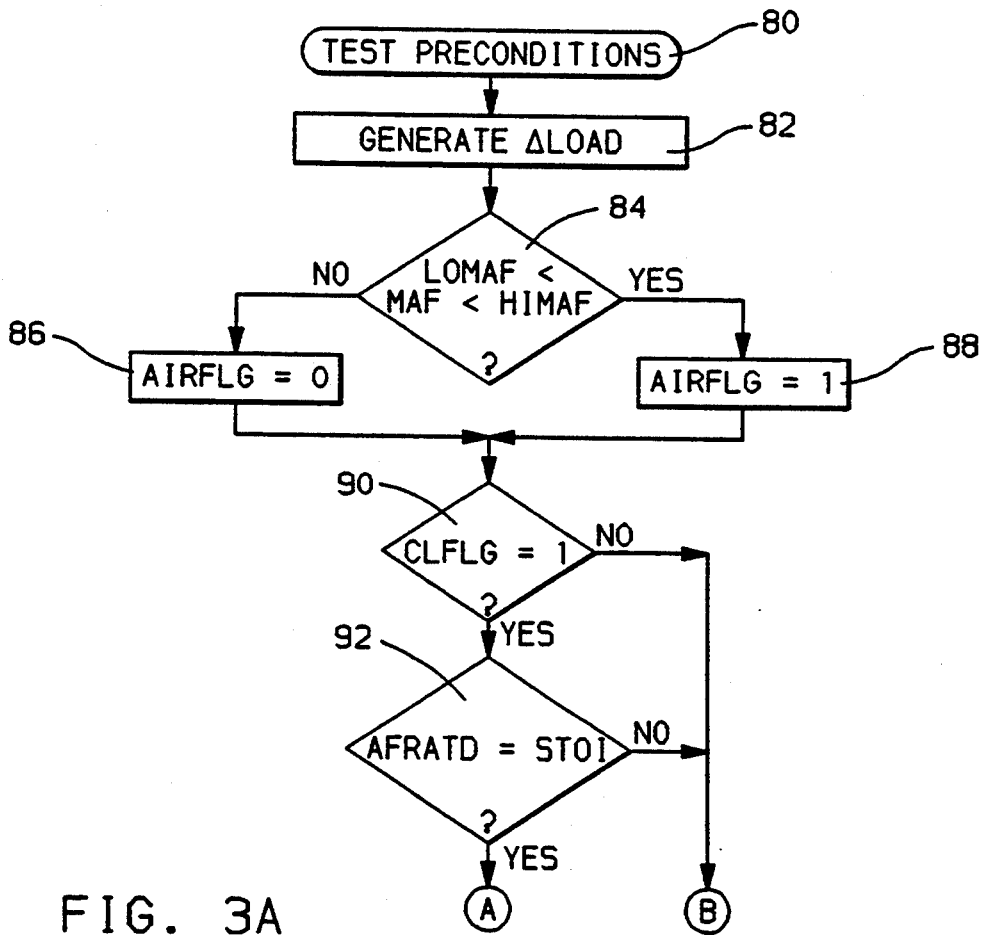
Figure 3B:
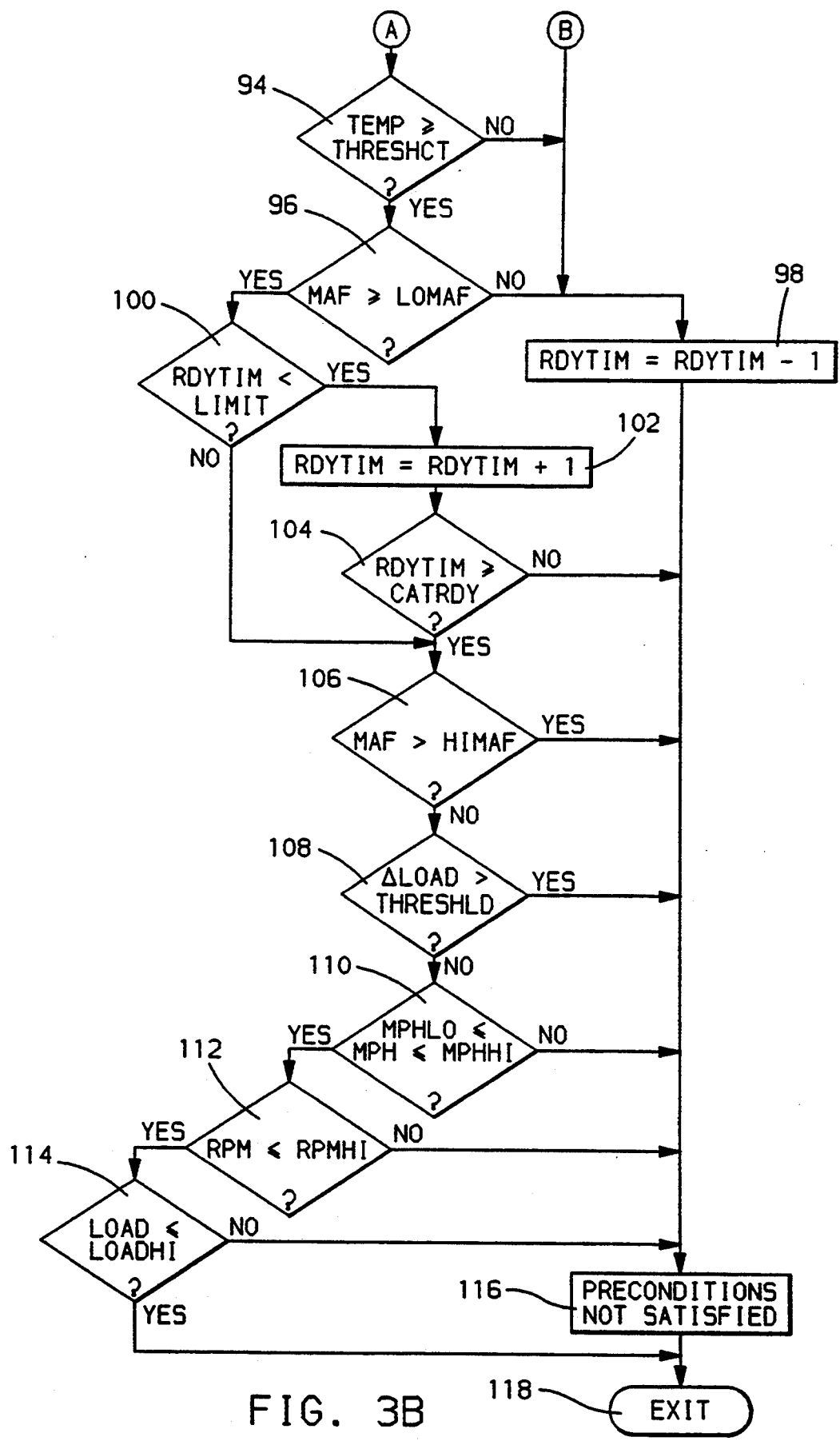

Specifically, upon occurrence of the 12.5 millisecond interrupt, and in addition to any other control or diagnostic steps carried out by the 12.5 millisecond interrupt service routine, the interrupt service routine moves to the steps of FIG. 2, starting at step 60, and moving then to a step 62, to read input data for use in the present embodiment, such as the input data provided by the controller input signals of FIG. 1, including TEMP, MAF, RPM, PRECAT, POSTCAT, and MAP. The routine then moves to a step 64 at which step a test precondition routine, illustrated by the steps of FIGS. 3a and 3b, is executed. Generally, this routine evaluates whether a number of preconditions to execution of the diagnostic of the present invention are met. If any are not met, the diagnostic is disabled for a present pre-converter oxygen sensor cycle, as will be described.

Figure 4:
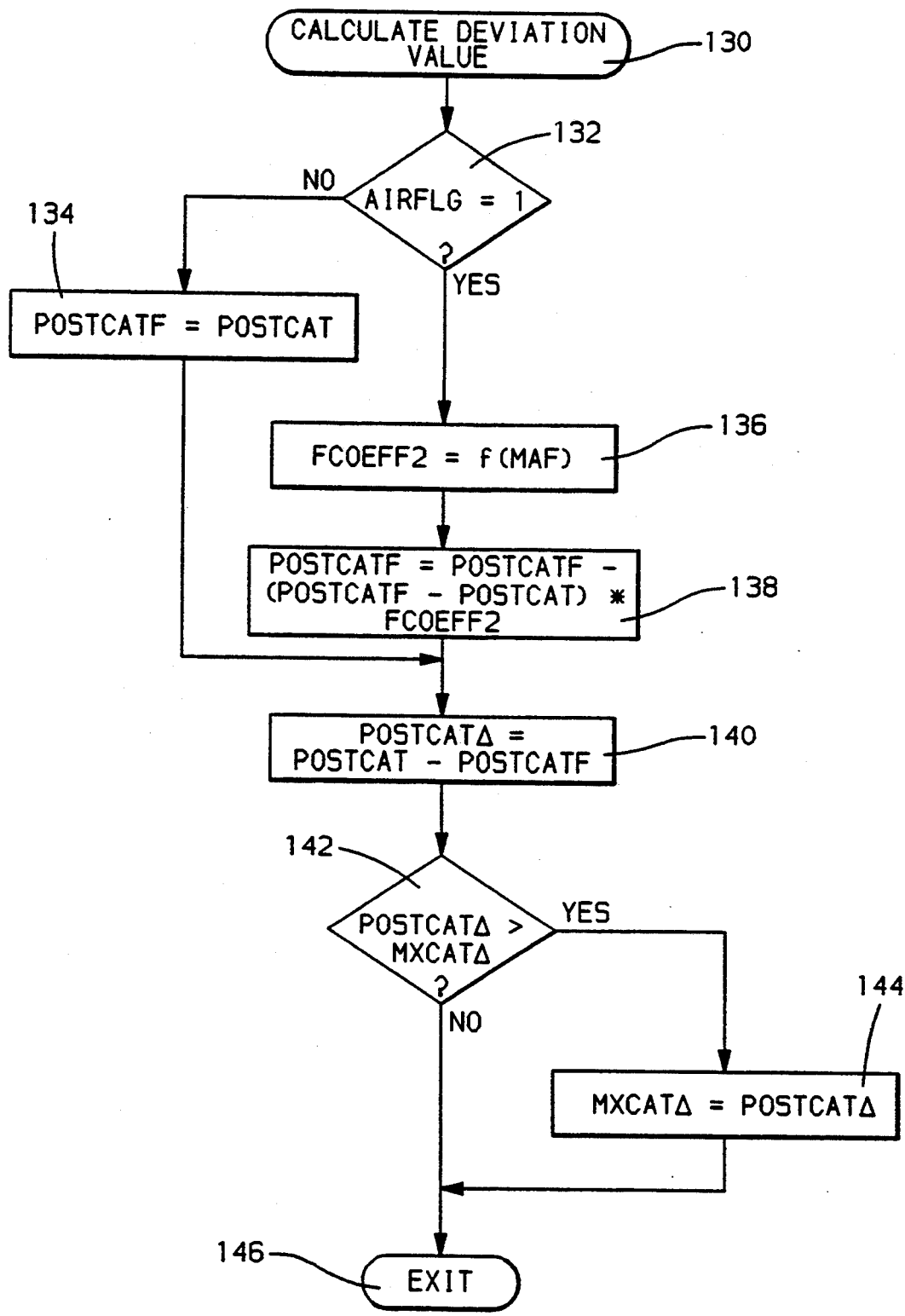

After executing the test precondition routine of FIGS. 3a and 3b, the routine of FIG. 2 operates at a step 66 to execute a routine illustrated in FIG. 4 to calculate a deviation value used in accord with the converter diagnostic of this invention. The routine of FIG. 2 then moves to a step 68 to execute a routine illustrated in FIG. 5 to generate an error value used in the present diagnostic. After calculating the error value through execution of the routine of FIG. 5, the routine of FIG. 2 moves to a step 70 to carry out a cycle analysis as illustrated in FIG. 6. The cycle analysis generally applies the diagnostic of this invention at appropriate times during cycles of the pre-converter oxygen sensor. The diagnostic data includes the calculated deviation value and the generated error value. After the cycle analysis selectively executes the present diagnostic, the routine of FIG. 2 returns, via its step 72, to any prior operations that were interrupted thereby, as described.

The test precondition routine of FIGS. 3a and 3b, when called at step 64 of FIG. 2, starts at a step 80 and moves to a step 82 at which a $\Delta$LOAD value is generated as follows $$\Delta LOAD = | LOAD - fLOAD |$$

in which LOAD is engine load, such as indicated by cylinder air rate, which may be determined as a well-known function of such parameters as MAP, RPM, or MAF, and in which fLOAD is filtered load, such as may be determined by passing load through a simple first order filter, for example with filter coefficient of 0.02. In this manner, $\Delta$LOAD provides an indication of whether a transient load condition is present, such as by a relatively large $\Delta$LOAD value, at which time the diagnostic of the present embodiment can be temporarily disabled.

After determining $\Delta$LOAD at step 82, the routine moves to a step 84 to determine whether measured mass airflow MAF into the engine intake manifold is within a range defined by prescribed limits LOMAF, set to approximately fifteen grams per second in this embodiment, and HIMAF, set to approximately thirty grams per second in this embodiment. If MAF is within the range, the routine moves to a step 88 to set flag AIRFLG to one. Otherwise, AIRFLG is set to zero at a step 86. Oxygen sensor values used in the routines of this embodiment are filtered using filter coefficients that vary with MAF. The filter models only apply when MAF is between LOMAF and HIMAF and, as will be described, are thus only applied when AIRFLG is set to one.

After either of steps 86 or 88, the routine moves to steps 90–98 to verify that a set of four preconditions are met consistently, as monitored by persistence counter RDYTIM. These four conditions support catalytic converter heating. If all four conditions are met, the converter is assumed to be heating up according to a calibrated heating schedule. If any one of the conditions are not met, the converter will be assumed to be cooling down according to a calibrated cooling schedule. To monitor converter heating or cool down, a persistence counter RDYTIM is incremented when all four are met and otherwise is decremented. When RDYTIM exceeds a calibrated threshold count CATRDY the converter is assumed to be sufficiently heated to support the present diagnostic thereof. RDYTIM is limited to a value LIMIT which is set a calibrated offset above CATRDY. The calibrated offset corresponds to the amount of time a cooling condition is present before a sufficiently heated converter is no longer sufficiently heated, as will be apparent from the following steps of the routine of FIGS. 3a and 3b.

Specifically, the routine first moves to a step 90, to check the status of a flag CLFLG, which is set when controller 36 is engaged in closed-loop air/fuel ratio control, and then moves to a step 92 to determine whether the desired air/fuel ratio to which actual air/fuel ratio is being controlled is the stoichiometric ratio. Such are two of the described four converter heatup conditions. CLFLG may be set through conventional engine control operations when closed-loop air/fuel ratio control is active. The value of variable AFRATD is assumed in this embodiment to be set to the value of the present active desired air/fuel ratio.

If either of these two converter heatup conditions are not met as determined at steps 90 and 92, the routine moves to decrement RDYTIM at step 98. Otherwise the routine moves to a step 94 to check the third converter heatup condition which is whether coolant temperature TEMP exceeds or is equal to a threshold temperature THRESHCT, set to 85 degrees Celsius in this embodiment. If TEMP is less than THRESHCT at step 94, the engine is not sufficiently heated to support, through heat transfer from the engine 10 (FIG. 1) to the converter 28, a level of catalytic activity in the converter consistent with a required level of activity for the present diagnostic, and the routine moves to the described step 98.

Otherwise, sufficient engine temperature is assumed to be present to support such a level of activity in the converter, and the routine moves to check the final of the four converter heatup conditions at step 96 at which MAF is compared to LOMAF, set at fifteen grams per second in this embodiment. If MAF is less than LOMAF, then engine inlet air flow is not within the testing range and the routine moves to the described step 98. Otherwise if MAF is greater than or is equal to LOMAF, the converter is modelled to be heating up, and the routine moves to limit the value of RDYTIM at step 100. As described, LIMIT is set to a calibrated offset above CATRDY to disable the present diagnostic in the event any of the four converter heatup conditions are not met for a period of time sufficient to support significant converter cooldown. For example, if any of the four conditions are not met for a long enough time that the converter may have cooled down below a minimum reliable diagnostic temperature, such as 420–450 degrees Celsius.

Returning to step 100 of FIG. 3b, if RDYTIM is less than LIMIT, set to a value equivalent to 220 seconds in this embodiment, the routine increments RDYTIM at a step 102. From step 102, the routine advances to a step 104 to compare the limited RDYTIM to a calibration value CATRDY, set to a value equivalent to 180 seconds in this embodiment. CATRDY represents the magnitude of persistence counter RDYTIM at or above which the catalytic converter is assumed to be heated to the minimum reliable diagnostic temperature.

Accordingly, if RDYTIM is greater than or equal to CATRDY at step 104, or if RDYTIM is greater than LIMIT at step 100, the first set of four converter heatup conditions are met, such that according to the converter activity model represented by such preconditions, it may be assumed that sufficient storage and release activity is present in the converter 28 (FIG. 1) that the diagnostic of the present embodiment may be meaningfully applied. The routine thus moves to check further preconditions at steps 106–114.

However, if any of the described preconditions are not met resulting in execution of steps 98, or if RDYTIM is not greater than CATRDY at step 104, the routine moves to a step 116, to set a flag indicating at least one precondition was not satisfied. This flag will be used in a yet-to-be-described decision on whether to proceed with the diagnostic of this embodiment. After step 116, the routine exits at step 118, to be described.

Further preconditions are checked at step 106–114. If any of these preconditions are not met, diagnostic operations will be prevented for the present cycle by moving to step 116 and setting the preconditions not satisfied flag, as described. In general, these further preconditions ensure that converter test conditions are within reasonable limits. For example, the engine should be operating at a level, such as indicated by engine speed, engine load or vehicle speed, not characterized by significant fueling errors. Furthermore, the engine operating level, such as may be indicated by engine intake airflow, should be one at which the converter will likely have the capacity to react to the volume of exhaust gas passed through it. Specifically, these further preconditions are tested by moving from either of steps 100 or 104 to step 106, to compare input signal MAF to HIMAF, set to thirty grams per second in this embodiment, as described. If MAF is greater than HIMAF, the converter may not be able to react to the volume of exhaust gas provided to it, and thus may falsely appear to not be operating properly. Under such conditions, to decrease the potential of a false converter diagnosis, the present iteration of the diagnostic is disabled by moving to step 116, as described.

However, if MAF is less than or equal to HIMAF at step 106, the routine moves to a step 108, to compare the computed ΔLOAD to a calibration value THRESHLD, set to approximately two percent of LOAD in this embodiment. THRESHLD is a threshold of load change above which load change indicates a transient load condition, typically associated with substantial fueling errors, which may lead to short periods of misleading converter behavior. Such misleading behavior may affect the veracity of the present diagnostic. As such, if ΔLOAD exceeds THRESHLD at step 108, the routine moves to the described step 116. Otherwise, the routine moves to a step 110 at which vehicle speed MPH is compared to a speed range defined by MPHLO, set to about thirty-five m.p.h. and MPHHI, set to about sixty-eight m.p.h.

As described, at high vehicle speeds, such as speeds above MPHHI, substantial fueling errors are sufficiently likely to occur and lead to false indications of degraded converter performance, that the diagnostic is disabled. Furthermore, at low vehicle speeds, such as speeds below MPHLO or such as when the vehicle is idling, the converter temperature may be significantly reduced. Such a change in temperature may perturb the converter performance measure relied on by the present diagnostic.

Furthermore at low vehicle speeds, such as speeds near idle, engine fueling control may vary to support stable engine control to the extent that the converter performance measure relied on by the present diagnostic may be perturbed. To reduce potential for false failure diagnoses under such conditions, diagnostic operations are temporarily suspended when vehicle speed is outside the range defined by MPHHI and MPHLO, by moving from step 110 to the described step 116.

However, if MPH is within the range at step 110, the routine moves to a step 112, to compare RPM, indicative of engine speed, to an upper limit RPMHI, set to about 3000 r.p.m. in this embodiment. If RPM exceeds RPMHI, the diagnostic is suspended by moving to the described step 116, as the information content of the signal POSTCAT decreases significantly under engine speeds above RPMHI. Alternatively, if RPM is less than or equal to RPMHI, the routine advances to a step 114, to determine whether LOAD, which represents engine load, is less than an upper limit value LOADHI, set to approximately 80 percent of LOAD in this embodiment. AS in the case of engine speed, if engine load is excessive, such as above LOADHI, the confidence in the veracity of the present diagnostic is sufficiently reduced due to significantly reduced quality of the signal POSTCAT. Under such a condition, the diagnostic is temporarily suspended, by moving to the described step 116. Otherwise, all preconditions of FIGS. 3a and 3b have been met, and the routine is exited at step 118, to return to step 66 of the routine of FIG. 2.

The routine to calculate a deviation value as called from step 66 of the routine of FIG. 2, is illustrated by FIG. 4, and starts at step 130. The routine moves to a step 132, to check the status of AIRFLG. If AIRFLG is set, indicating MAF is within a calibrated range in which a filter model applies, the routine moves to a step 136, to apply the model, by selecting a filter coefficient FCOEFF2 as a function of MAF. A general illustration of the functional relationship between FCOEFF2 and MAF is shown by curve 302 of FIG. 9 between MAF1 which may be about ten grams per second and MAF2 which may be about forty grams per second. FCOEFF2 may be selected through a conventional lookup table in controller read only memory ROM 42 (FIG. 1), as the coefficient corresponding to the value of MAF.

After selecting the filter coefficient at step 136, the routine moves to filter the postconverter oxygen sensor signal POSTCAT via conventional lag filter equation using the selected coefficient as follows

POSTCATF=POSTCATF−((POSTCATF−POSTCAT) * FCOEFF2)

in which POSTCATF is the filtered version of POSTCAT.

Returning to step 132, if AIRFLG was not set to one, MAF is outside the range in which the model applies, and the routine moves to a step 134 to pass POSTCAT through directly to POSTCATF without filtering POSTCAT (although POSTCAT may have already been filtered in accord with general practice in automotive signal conditioning). After filtering POSTCAT at step 138, or after passing POSTCAT through to POSTCATF without filtering at step 134, the routine moves to step 140, to calculate the post-converter oxygen sensor deviation value POSTCATΔ, as the difference between POSTCAT and POSTCATF.

The routine then proceeds to a step 142 to compare POSTCATΔ to MXCATΔ. MXCATΔ holds the maximum calculated POSTCATΔ over each diagnostic cycle. A diagnostic cycle starts when a pre-converter oxygen sensor value transitions from a value less than to a value greater than a calibrated bias value, as will be described in FIG. 5. During that diagnostic cycle the pre-converter oxygen sensor value will exceed the bias value for a period of time and then will transition below the bias value for a period of time. That cycle is complete and the next consecutive diagnostic cycle starts when the pre-converter oxygen sensor value transitions above the bias value, at which time cycle data including MXCATΔ is processed, and after which MXCATΔ is reset to zero to prepare for storage of the maximum POSTCATΔ value for the new cycle.

Returning to FIG. 4, if POSTCATΔ exceeds MXCATΔ at step 142, the routine moves to a step 144, to update MXCATΔ with the new maximum deviation value for the cycle. Next, or if MXCATΔ was greater than or equal to POSTCATΔ at step 142, the routine exits at step 146, and returns to the step 66 of FIG. 2.

Figure 5:
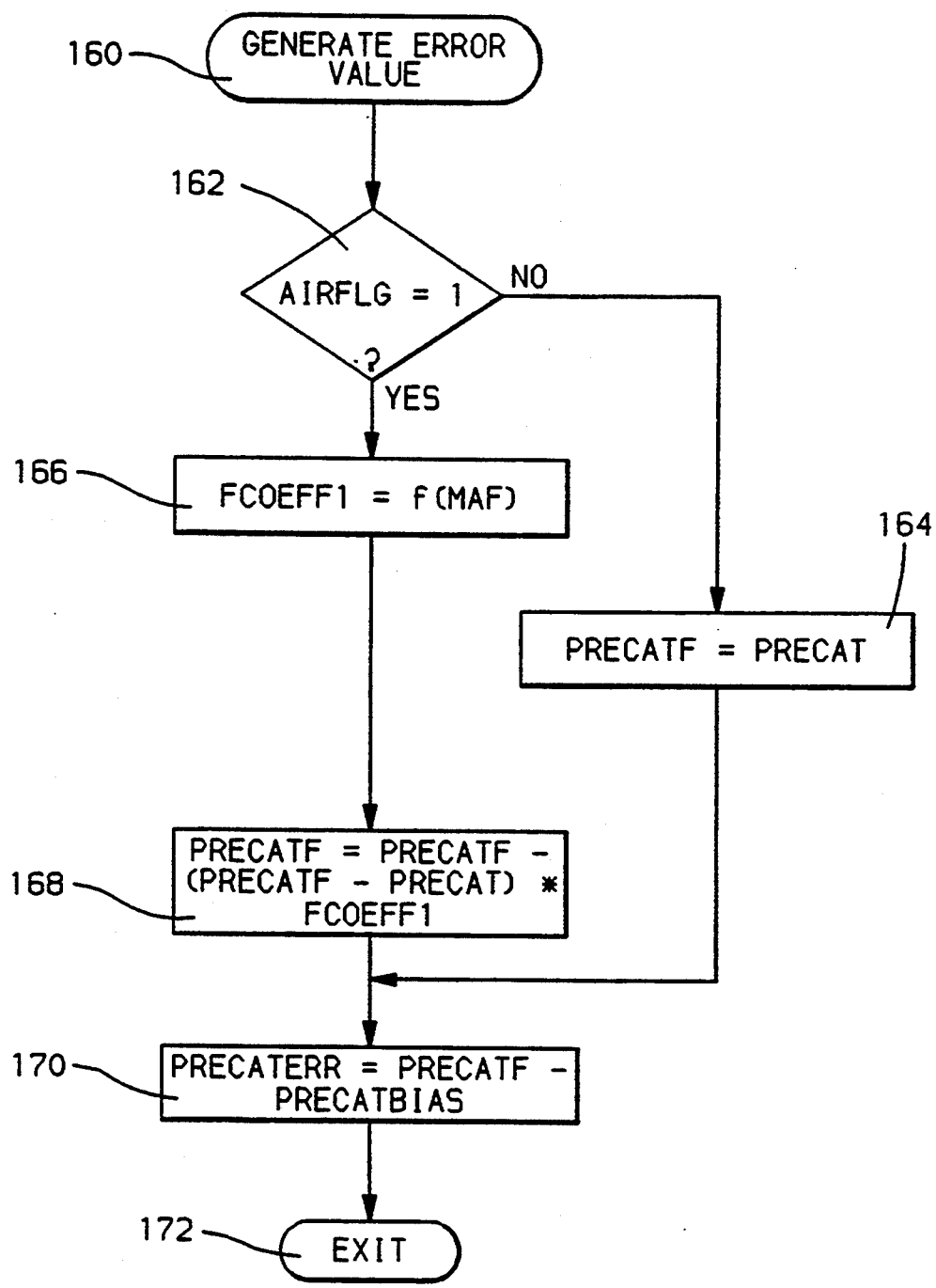
Figure 6:
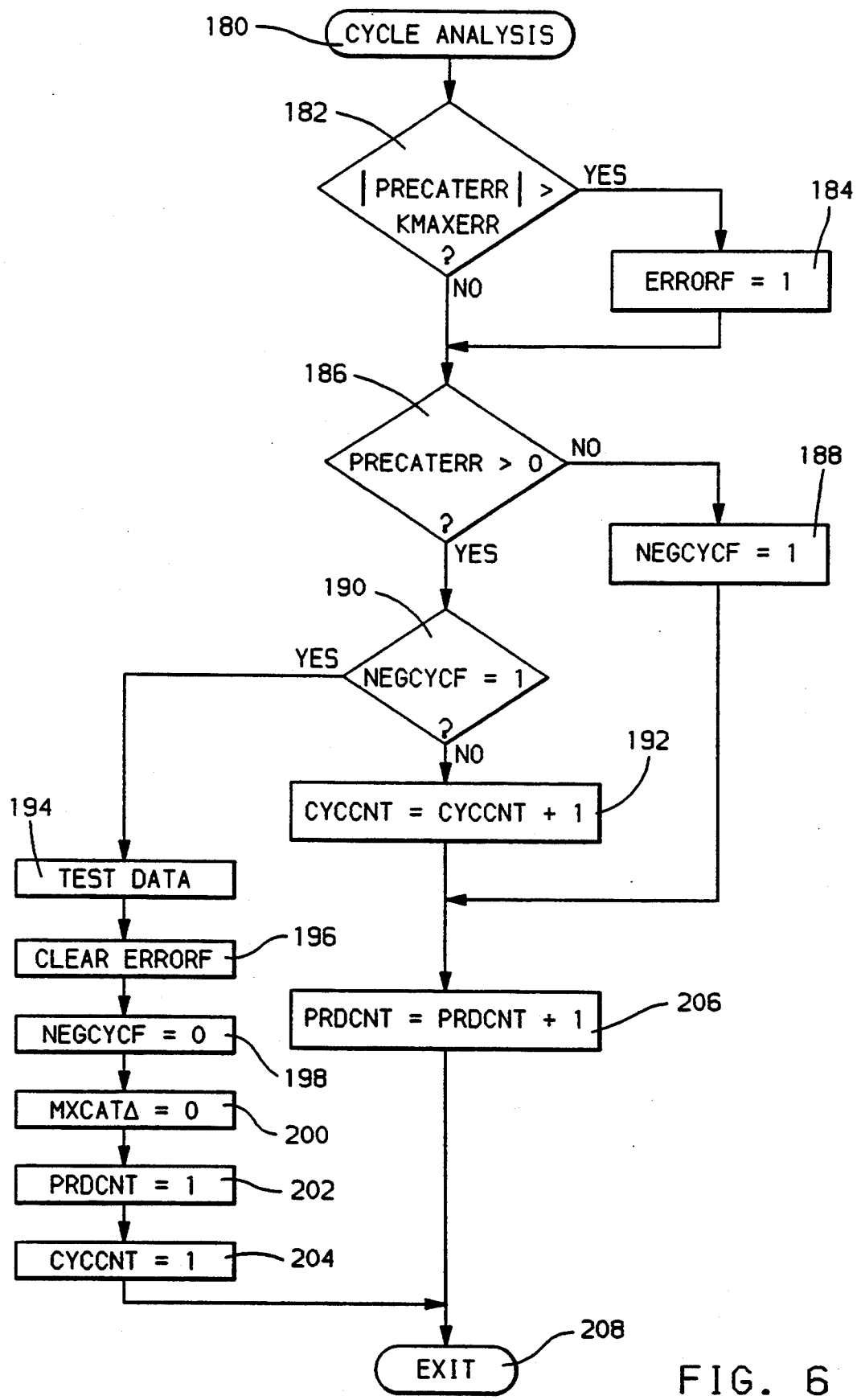

The routine to generate an error value is called at step 68 of the routine of FIG. 2, is illustrated by FIG. 5, and starts at step 160. The routine moves to a step 162 to check the status of AIRFLG. If AIRFLG is set to one, indicating MAF is within a range in which a filter model for filtering PRECATF applies, the routine moves to steps 166-168 to apply the model.

Specifically, a filter coefficient FCOEFF1 is selected as a predetermined function of MAF at step 166. The general functional relationship for the present embodiment may be as is illustrated by curve 300 of FIG. 9. The selection of values from that relationship may be made by applying MAF to a conventional lookup table in read only memory ROM 42 of controller 36, and by referencing a value for FCOEFF1 corresponding to the applied MAF.

After referencing FCOEFF1 at step 166, the routine moves to a step 168 to apply the coefficient in a conventional lag filtering of the pre-converter oxygen sensor signal PRECAT as follows

PRECATF=PRECATF−((PRECATF−PRECAT) * FCOEFF1)

in which PRECATF is the filtered version of PRECATF. Returning to step 162, if AIRFLG is not set to one, the routine moves to a step 164 to bypass the filtering of PRECAT, by assigning PRECATF the value PRECAT without any filtering, aside from any conventional signal filtering in accord with conventional practice in engine control.

After either of step 164 or step 168, the routine moves to step 170, to determine an error value PRECATERR as the difference between PRECATF and a predetermined bias value PRECATBIAS, set to 450 millivolts in this embodiment. PRECATBIAS is set to provide a threshold voltage defining rich and lean regions into which the signal PRECATF may be classified. For example, if PRECATF is less than PRECATBIAS, the engine air/fuel ratio is diagnosed as lean, and if PRECATF is greater than PRECATBIAS, the engine air/fuel ratio is diagnosed as rich. After determining PRECATERR at step 170, the routine returns to step 68 of FIG. 2 via step 172.

The cycle analysis routine is called from step 70 of the routine of FIG. 2, is illustrated by FIG. 6, and starts at step 180. The cycle analysis routine generally analyzes the processed pre-converter error term to set up a sample window for generating the maximum post-converter deviation term. The sample window remains open for each period including a positive cycle and a negative cycle of the fluctuating pre-converter error term. When the error term drops below zero, the positive cycle ends and a negative cycle begins. When the error term moves above zero, the negative cycle ends and a new positive cycle begins.

Specifically, the cycle analysis routine starts at the step 180, and moves to a step 182 to compare the magnitude of PRECATERR to a value KMAXERR, set to approximately 260 millivolts in this embodiment. If the magnitude of PRECATERR exceeds KMAXERR, the actual engine air/fuel ratio has varied too far from the desired air/fuel ratio, such as the stoichiometric ratio to lead to reliable converter testing, and an error flag ERRORF is set to one at step 184, indicating an extreme excursion in actual engine air/fuel ratio. An error flag set to one will prevent diagnostic operations during the present period.

Next, or if the magnitude of PRECATERR did not exceed KMAXERR at step 182, the routine moves to a step 186, to compare PRECATERR to zero. If PRECATERR is less than or equal to zero, the present positive cycle is complete, and the routine moves to a step 188, to set a flag NEGCYCF to one, indicating the end of the present positive cycle, or equivalently that a negative cycle is presently active. The routine then moves to a step 206, to be described.

Returning to step 186, if PRECATERR is greater than zero, the present positive cycle is not yet complete and the routine moves to a step 190, to determine if NEGCYCF is set to one indicating the present iteration of the routine of FIG. 6 is the first since the present positive cycle began. If so, a period has been completed, the period including the most recent positive cycle and the most recent (and just completed) negative cycle. If the period is complete, the data from that period is analyzed by moving to a step 194 to call the test data routine illustrated in FIG. 7. Generally, the test data routine will allow analysis of the deviation data if two consecutive valid periods of data are determined to have been accumulated.

After executing step 194 at which the test data routine is called, the routine of FIG. 6 moves to steps 196-204 to initialize cycle analysis variables in preparation for the present period that has just begun. Specifically, ERRORF is cleared at step 196, NEGCYCF is cleared to zero at step 198, MXCATΔ is cleared to zero at step 200, PRDCNT is reset to one at step 202, and CYCCNT is reset to one at step 204. After initializing the cycle analysis variables at steps 196-204, the routine exits at step 208, to return to step 70 of FIG. 2.

Returning to step 190 of FIG. 6, if NEGCYCF is not set to one, the present iteration of the routine of FIG. 6 is not the first in the present positive cycle, and the routine moves to a step 192, to increment counter CYCCNT, which holds a count of the number of iterations of the routine of FIG. 6 while in the present positive cycle.

Next, or after step 188, the routine moves to a step 206, to increment a period counter PRDCNT, which holds a count of the number of iterations of the routine of FIG. 6 during the entire present period including both the positive cycle of the present period and the negative cycle of the present period. After incrementing PRDCNT at step 206, the cycle analysis routine is exited at the described step 208.

Figure 7:
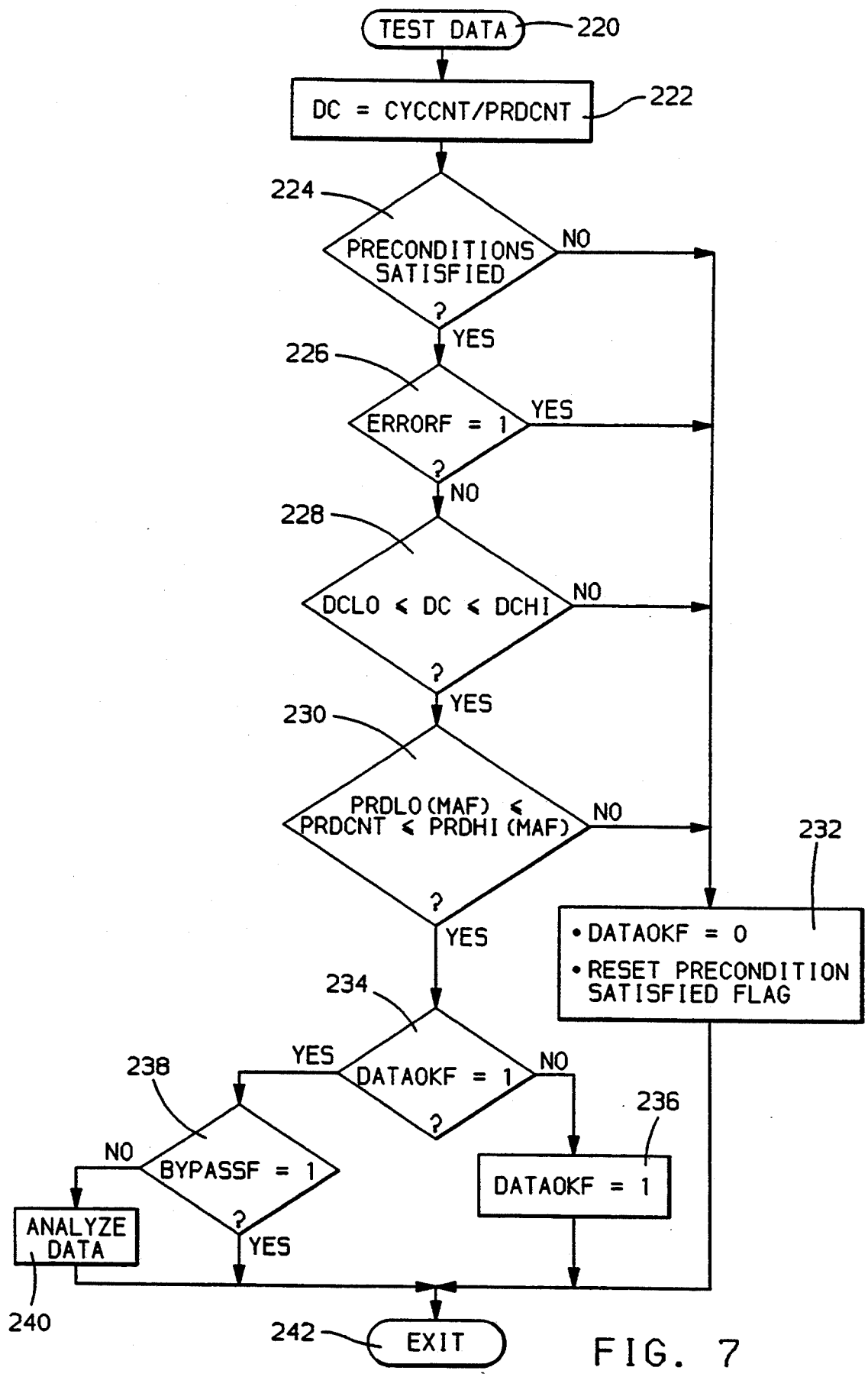

The test data routine is called from step 194 of the routine of FIG. 6, is illustrated by the routine of FIG. 7, and starts at step 220. The test data routine generally provides for deviation data analysis by calling the analyze data routine of FIGS. 8a and 8b when two full periods of valid data have been accumulated. The routine starts at step 220 and moves to a step 222 to calculate a duty cycle DC for the most recent completed period as the quotient of CYCCNT/PRDCNT. The duty cycle is thus the ratio of the duration of the positive cycle of the most recent period to the duration of that entire period.

After determining DC at step 222, the routine moves to a step 224 to determine whether all of the preconditions analyzed in FIGS. 3a and 3b were met. If not, the present period of data is not further analyzed by moving to step 232 to clear flag DATAOKF and to reset the preconditions not satisfied indication, such as by resetting a flag in random access memory RAM 40 (FIG. 1), to allow analysis of preconditions in the next iteration of this diagnostic. The routine then exits at step 242, to return to step 194 of FIG. 6.

Returning to step 224, if all preconditions are satisfied, the routine moves to a step 226, to check the status of ERRRORF. IF ERRORF is set to one, such as at step 184 of the routine of FIG. 6, the present period of data is not analyzed by moving to the described step 232. Otherwise, the routine moves to a step 228 to carry out another validity check.

Specifically, the duty cycle DC is checked at step 228 to determine whether it is within a reasonable range defined by DCLO, set at twenty percent duty cycle in this embodiment, and DCHI, set at eighty percent duty cycle in this embodiment. The processed pre-converter error term should exceed the calibrated bias value for a reasonable portion of each period, represented by the reasonable duty cycle range, under appropriate test conditions. If not within the reasonable range, the actual engine air/fuel ratio is not cycling reasonably for the active closed-loop air/fuel ratio control, indicating some control perturbation is active that may degrade the reliability of the present diagnostic.

Accordingly, if DC exceeds the reasonable range at step 228, the data of the present period is not analyzed by moving to the described step 232. However, if DC is within the range, the routine moves to a step 230, to check the reasonableness of the period itself against a reasonable period range defined by PRDLO(MAF) and PRDHI(MAF). A representative calibration of the functional relationship between both PRDLO and PRDHI and MAF is illustrated by respective curves 304 and 306 in FIG. 9. The values of PRDLO and PRDHI may be referenced as the period values corresponding to a MAF value using conventional lookup tables, in the manner described for previously detailed lookup tables of this embodiment.

These upper and lower bounds are referenced as predetermined functions of MAF as the reasonable period of oscillation of the pre-converter oxygen sensor value around the bias value. As MAF increases, the duration of such periods normally decreases responsive to a corresponding decrease in air/fuel ratio control response time. The comparison of step 230 provides some verification that such normal correlation between MAF and period duration is present, and therefore that the post converter oxygen sensor may be functioning in a manner suitable for the present diagnostic.

If PRDCNT is outside the reasonable period range at step 230, data analysis is avoided by moving to the described step 232. However, if PRDCNT is within the range, the routine moves to a step 234, to check the status of DATAOKF. If DATAOKF is not set to one, indicating the data for the prior consecutive period was not found to be valid, the routine moves to step 236 to set DATAOKF to one, indicating the data for period presently being analyzed is valid. If the next period of data is found to likewise be valid, analysis of the data will be allowed. After step 236, the routine exits at step 242, as described.

Returning to step 234, if DATAOKF is set to one indicating the prior consecutive period of data was found to be valid, then two consecutive periods of valid data have been received and the data analysis may be carried out. Accordingly, the routine moves to a step 238 to check a flag BYPASSF indicating the diagnostic already was completed once for the present vehicle operating cycle. BYPASSF may be stored in random access memory RAM 40 (FIG. 1), such that it is cleared each time the vehicle is started, for example in an automatic memory initialization carried out by central processing unit CPU 38 (FIG. 1) when power is initially applied to controller 36. BYPASSF is set when deviation data is fully analyzed for converter performance diagnosis, and when set, the flag precludes further converter testing.

Figure 8A:
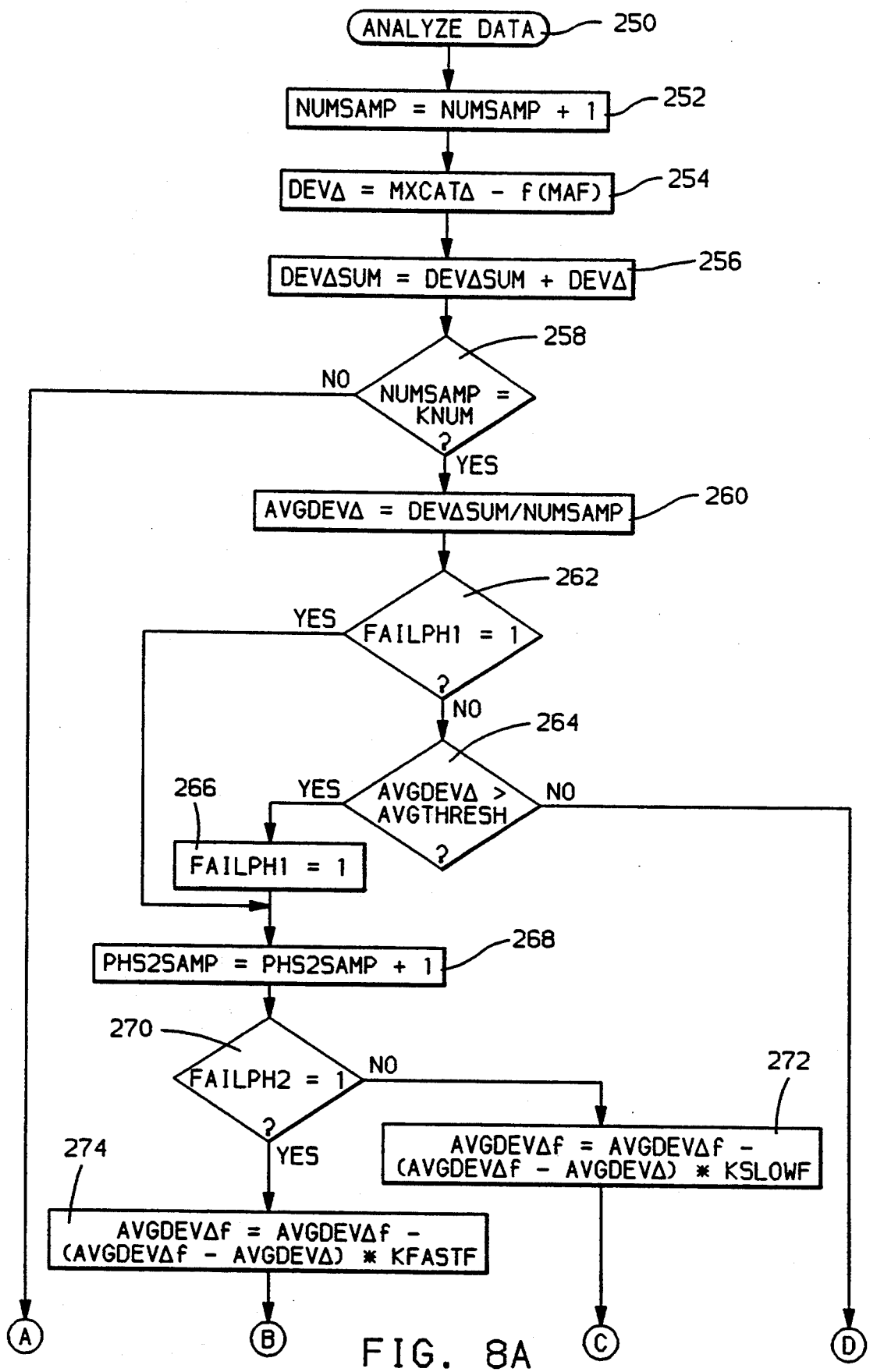
Figure 8B:
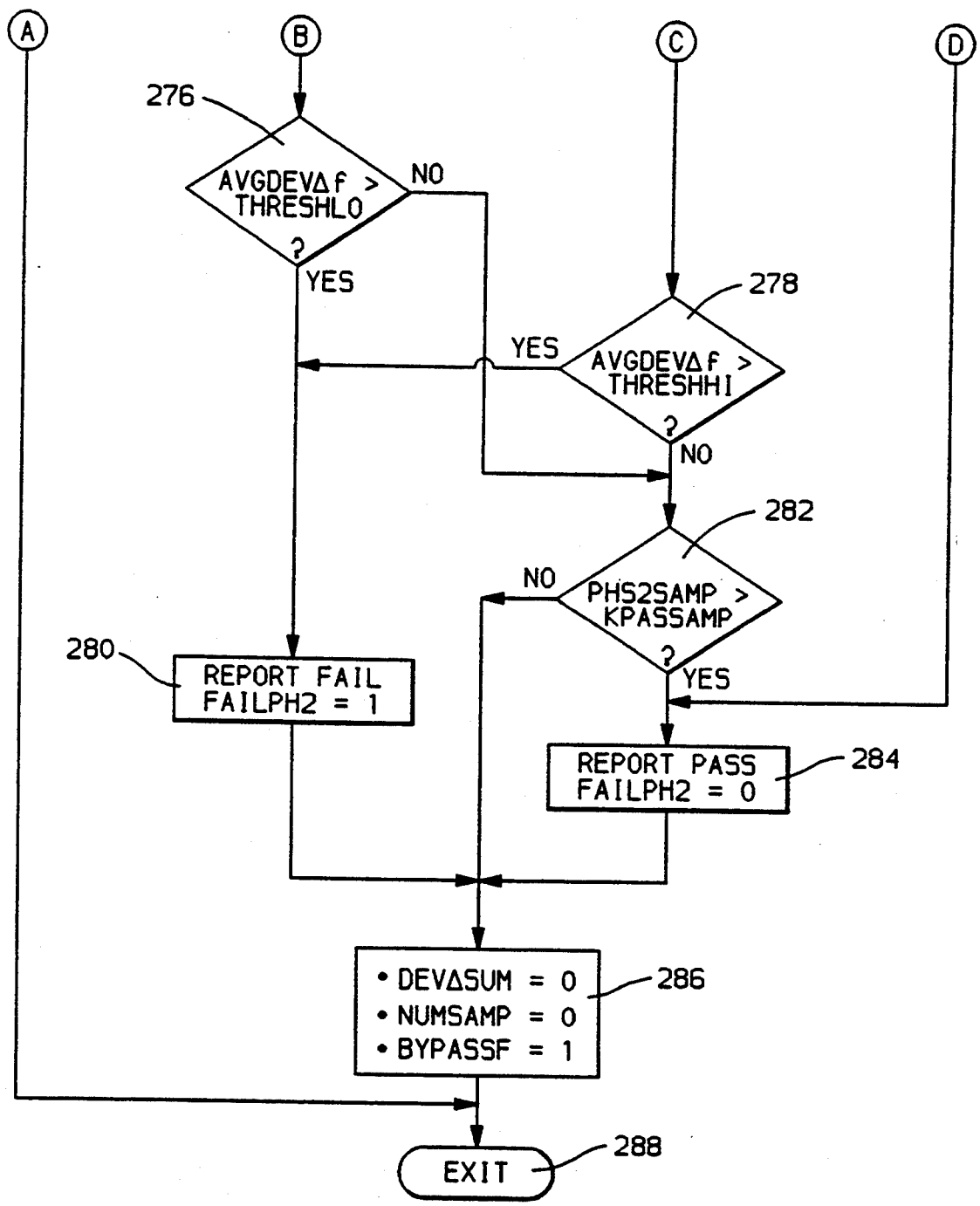

Accordingly, if BYPASSF is set at step 238, the routine exits via the described step 242. However, if BYPASSF is not set at step 238, data analysis is carried out by calling, at a step 240, an analyze data routine, such as is illustrated in FIGS. 8a and 8b. After executing the analyze data routine, the routine of FIG. 7 exits via the described step 242.

Figure 9:
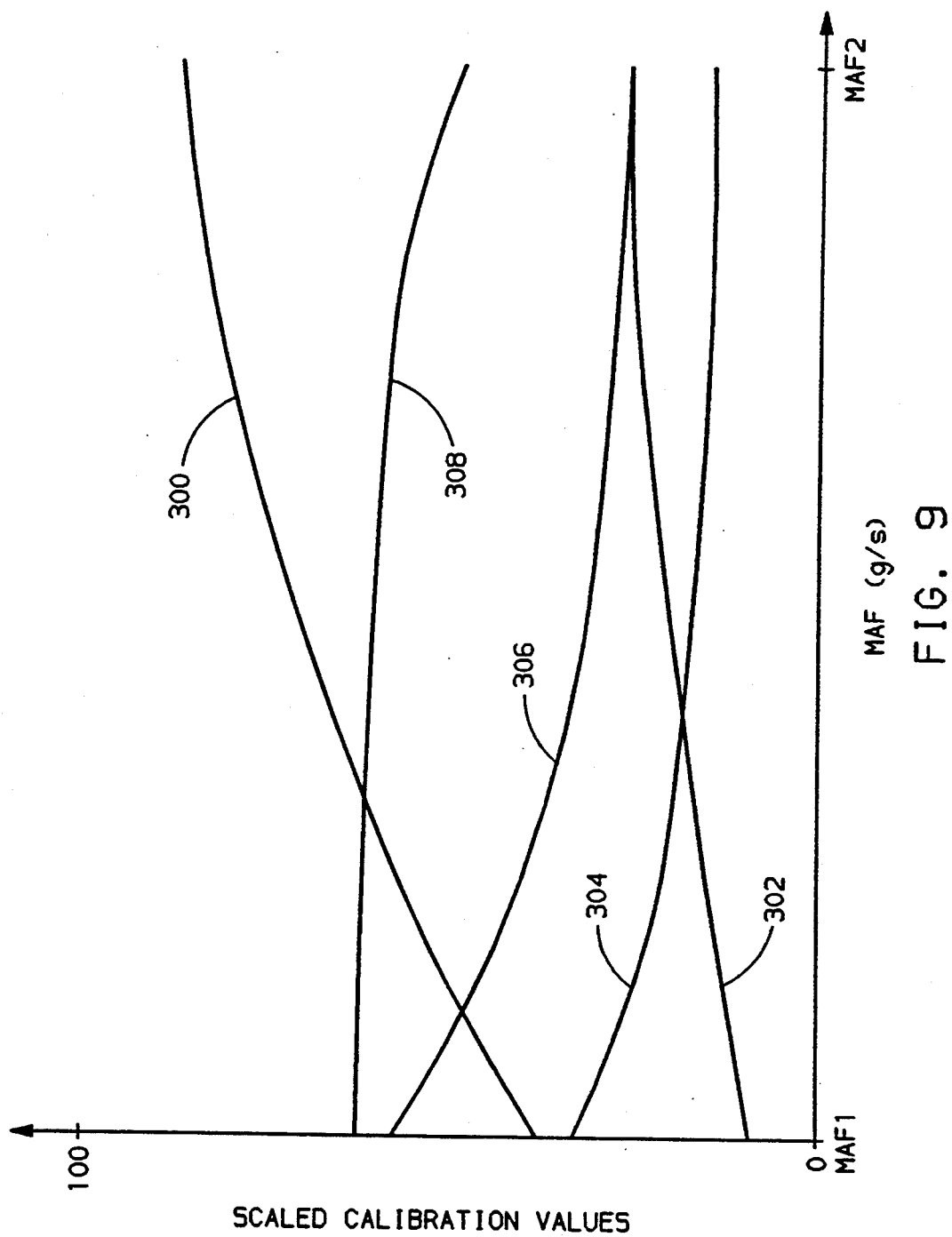
FIG. 9 generally illustrates functional relationships applied in carrying out the steps of FIGS. 2–8.

The routine to analyze data is called at step 240 of the routine of FIG. 7 as described, is illustrated by the routine of FIGS. 8a and 8b, and starts at step 250. The routine moves to a step 252 to increment a sample counter NUMSAMP, stored and maintained in NVRAM 44 (FIG. 1), and then moves to a step 254 to calculate a deviation difference value DEV$\Delta$ as follows $$DEV\Delta = MXCAT\Delta - f(MAF)$$

in which f(MAF) is a predetermined function of input signal MAF, applied to MXCAT$\Delta$ to yield, for a given catalytic converter, a substantially constant DEV$\Delta$ value across a range of MAF values, such as the range from MAF1 to MAF2 in FIG. 9. For example, the curve 308 in FIG. 9 illustrates the function f(MAF) for a converter such as is included in the present embodiment.

After determining DEV$\Delta$ at step 254, a sum DEV$\Delta$SUM of deviation difference values is updated at step 256 by adding DEV$\Delta$ thereto. DEV$\Delta$SUM is stored in NVRAM 44 (FIG. 1) so as to be preserved when the controller 36 (FIG. 1) is not operating. The routine then moves to a step 258, to compare NUMSAMP to a calibrated constant KNUM, set to fifty in this embodiment as the minimum number of samples needed before valid data analysis may be provided in accord with this embodiment. Until KNUM samples of DEV$\Delta$ are included in DEV$\Delta$SUM, the routine will proceed from step 258 to exit at step 288, to return to step 240 of the routine of FIG. 7.

However, once the number KNUM of DEV$\Delta$ samples are included in the sum DEV$\Delta$SUM as determined at step 258, the data analysis continues by moving to a step 260, to compute AVGDEV$\Delta$, an average DEV$\Delta$ value taken over the KNUM number of DEV$\Delta$ samples, as follows $$AVGDEV\Delta = DEV\Delta SUM/NUMSAMP.$$

AVGDEV$\Delta$ is stored in non-volatile random access memory NVRAM 44 (FIG. 1). The routine then proceeds to a step 262, to check the status of flag FAILPH1 which, when set to one, indicates a failure of the first of the two stages of the diagnostic test of this embodiment.

Generally, this diagnostic includes two test stages. The first stage is a fast, high level test of the oxygen storage and release performance of the catalytic converter 28 (FIG. 1). The first stage does not require a significant amount of time to apply due to the relatively small deviation in DEV$\Delta$ data, yet accurately characterizes a degradation in converter performance out of a high performance range into a range in which closer, more time consuming scrutiny of converter performance is needed. When a transition out of the high performance range is detected through operation of the first stage test, a second stage test is applied, and the first stage is disabled.

The second stage test provides a higher resolution, less variation sensitive diagnosis of converter performance than the first stage, through application of additional data filtering, and through use of a large number of data samples. Specifically, a first portion of the stage two test moderately filters converter performance data and compares such filtered data to a high threshold. If the data exceeds the high threshold, an indication of a failed test is made and a second portion of the stage two test is applied in which a lightly filtered converter performance data is compared to a relatively low threshold value.

The second portion provides an opportunity for the converter to pass the diagnostic despite having failed the first portion, so as to prevent diagnosis of a failed converter if a mere transient deterioration in converter performance caused the first portion of the stage two test to diagnose a failure. To further provide false alarm protection, any failure indication, such as will be made by the first stage test and both portions of the second stage test, may be removed if either portion of the stage two test is passed, but only after a relatively large number of samples are included in the stage two diagnostic, as will be detailed.

Returning to FIGS. 8a and 8b, the two stages of the test begin by moving from step 260 to step 262, to determine if stage one has previously failed, as indicated by FAILPHi set to one. If FAILPHi is set, the routine moves to a step 268, to begin stage two testing. If FAILPHi is not set, a stage one analysis is carried out at a step 264, by comparing AVGDEV$\Delta$ to a stage one threshold value AVGTHRESH, calibrated to $-87$ millivolts in this embodiment. If AVGDEV$\Delta$ exceeds the threshold, the phase one test is failed, and is disabled by setting flag FAILPHI to one at a step 266. The routine then moves to a step 268, to begin phase two testing.

If AVGDEV$\Delta$ does not exceed AVGTHRESH at step 264, the converter is still performing in a high performance range, wherein accurate converter diagnostics may be provided solely through the phase one testing. The routine thus moves to a step 284, to indicate the converter passed the diagnostic test for the present vehicle operating cycle. The indication at step 284 may be made by storing an appropriate code in non-volatile memory NVRAM 44 (FIG. 1), such as for use in other controller operations. Such operations may include those carried out by a diagnostic executive which, among other operations, controls illumination of diagnostic lamps (not shown) positioned to be visible to the vehicle operator.

Returning to step 284, after indicating the passed diagnostic test, a flag FAILPH2, used in the present routine, is cleared to zero. The routine then moves to a step 286, to reset variables DEV$\Delta$SUM and NUMSAMP, to prepare for the next execution of this diagnostic. A bypass flag BYPASSF, stored in volatile random access memory RAM 40 (FIG. 1) is then set, indicating the diagnostic came to a conclusion for the present vehicle operating cycle.

Once BYPASSF is set, no further converter diagnoses will occur, as described at step 238 of FIG. 7. BYPASSF is cleared through conventional RAM initialization when power is first applied to an idle controller, such as when the vehicle operator applies ignition power to the controller at the start of a vehicle operating cycle. BYPASSF provides for only one complete converter diagnostic through the operations of the present embodiment for each vehicle operating cycle. The time constant that may be associated with converter performance deterioration is sufficiently large that further diagnostic operations in a vehicle operating cycle would be substantially superfluous. After step 286, the routine is exited at a step 286, to return to the described operations of FIG. 2.

Returning to step 268 at which stage two operations commence, a sample counter PHS2SAMP is incremented as a count of the number of executed stage two test iterations. PHS2SAMP is stored in non-volatile random access memory NVRAM 44 (FIG. 1) in this embodiment to maintain a count of the total number of iterations of the stage two operations, such as those illustrated in FIGS. 8a and 8b. After step 268, the routine moves to a step 270, to check the status of flag FAILPH2 which, when set to one, indicates a previous failure of the stage two test. FAILPH2 is stored in NVRAM 44 (FIG. 1) so as to hold its value between vehicle operating cycles.

If FAILPH2 is not set to one at step 270, the routine moves to moderately filter the average deviation difference value AVGDEVΔ in accord with the described first portion of the stage two test. For example, in this embodiment, the moderate filtering is provided by passing AVGDEVΔ through a conventional lag filter having a filter coefficient selected through application of the exponentially weighted moving average process, such as is described by J.M. Lucas and M.S. Saccucci in "Exponentially Weighted Moving Average Control Schemes: Properties and Enhancements," *Technometrics*, vol. 32 (1990).

The moderate filtering is provided as follows

AVGDEVΔF=AVGDEVΔF−((AVGDEVΔ-F−AVGDEVΔ) * KSLOWF)

in which KSLOWF is a moderate lag filter coefficient, selected according to the EWMA process in this embodiment as 0.05. This coefficient value is selected under the assumption that very slow converter oxygen storage capacity loss occurs under normal converter aging.

After generating AVGDEVΔF at step 272, the routine moves to a step 278, to compare the filtered value to a high threshold value THRESHHI, set to a value corresponding to nine millivolts in this embodiment. Such a value is reached through analysis of the rate of likely catalyst deterioration in the converter, the average run length, the number of samples being analyzed, and a calibration of the standard deviation of the individual DEVΔ values.

If AVGDEVΔF exceeds THRESHHI, the first portion of the stage two indicates a converter failure, and the routine moves to a step 280, to report the failure, such as to the described diagnostic executive. The routine then sets flag FAILPH2 indicating detection of the stage two failure. Once FAILPH2 is set, the second portion of the stage two diagnostic will become active and the first portion will be deactivated, to allow an opportunity to pass the diagnostic despite the failure of the first portion, for example in the event the first portion merely diagnosed a transient performance degradation.

After setting FAILPH2 at step 280, the routine moves to the described step 286. Returning to the step 278, if AVGDEVΔF is not greater than THRESHHI, the routine moves to a step 282, to compare PHS2SAMP, the total number of iterations of the stage two operations, such as those of FIGS. 8a and 8b, to KPASSAMP, which is set to four in this embodiment. KPASSAMP should be calibrated to a value that minimizes the probability of falsely passing a converter when it is indeed failing. KPASSAMP is a function of the expected number of vehicle operating cycles and the expected variation in DEVΔ over the vehicle life. If PHS2SAMP exceeds KPASSAMP at step 282, the routine moves to a step 284, to report that the converter passed the diagnostic test. Such a report may be made by setting a flag in non-volatile memory NVRAM 44 (FIG. 1) to which the diagnostic executive has access, for example to allow the executive to clear any ongoing indication of a converter failure. After indicating the pass condition at step 284, the routine clears flag FAILPH2, and then moves to the described step 286.

Returning to the step 270, if FAILPH2 is set to one indicating the first portion of the stage two test diagnosed a failed converter, the routine moves to a step 274, to commence the second portion of the stage two test, by forming AVGDEVΔF, a lightly filtered average deviation difference value having a coefficient selected through application of the described EWMA process as follows

AVGDEVΔF=AVGDEVΔF−((AVGDEVΔ-F−AVGDEVΔ) * KFASTF in which KFASTF is a fast filter coefficient, set to 0.5 in this embodiment, such as through the EWMA process. The calibrated value for KFASTF is set in response to a recognized potential for a converter to undergo fast oxygen storage capacity recovery. For example, certain engine fuel contaminants or additives may lead to transient oxygen storage loss in marginal converters, after which such recovery may occur. This lightly filtered value provides a second level of testing to protect against a false failure indication for example in the event the first portion of the stage two test was operating during a period of transient converter performance deterioration.

After forming the lightly filtered AVGDEVΔF value at step 274, the routine moves to a step 276 to compare the lightly filtered value to a low threshold value THRESHLO, set to −13 millivolts in this embodiment. THRESHLO is set based on an assumed fast catalyst recovery from transient oxygen storage loss, an expected average vehicle run length, an expected sample size, an expected standard deviation of the DEVΔ values, and on the value of THRESHHI.

If AVGDEVΔF exceeds THRESHLO, the second portion of the stage two test has failed, and the routine moves to the described step 280, to report the failure. Otherwise, if the filtered value does not exceed THRESHLO at step 276, the second portion of the stage two test has passed, and an assumption may be made that the first portion of the stage two test indicated a mere transient converter failure. Accordingly, the routine moves to the described step 282, to determine if conditions support indication that the converter passed the test.

The preferred embodiment for the purpose of explaining the invention is not to be taken as limiting or restricting the invention since many modifications may be made through the exercise of skill in the art without departing from the scope of the invention.

The embodiments of the invention in which a property or privilege is claimed are described as follows:

1. A method for transforming an oxygen content signal into a signal indicating the oxygen storage and release capacity of a catalytic treatment means operative to catalytically treat internal combustion engine emissions passing through the catalytic treatment means, for diagnosing a fault in the catalytic treatment means, comprising the steps of:

for each of a plurality of test periods, (a) sensing a predetermined event indicating a start of a test period, (b) sensing a predetermined event indicating an end of the test period, (c) periodically sampling, after the indicated start of the test period and before the indicated end of the test period, an oxygen content signal indicating the oxygen content of engine emissions that have passed through the catalytic treatment means, (d) estimating rates of change in oxygen content between successive samples of the oxygen content signal, (e) determining a maximum rate of change in oxygen content from the estimated rates of change;

generating an average rate of change signal indicating the oxygen storage and release capacity of the catalytic treatment means as a predetermined function of the determined maximum rates of change in oxygen content for each of the plurality of test periods;

comparing the generated average rate of change signal to a predetermined signal threshold value;

providing a diagnostic signal indicating a decreased oxygen storage and release capacity of the catalytic treatment means when the generated average rate of change signal exceeds the predetermined signal threshold value; and carrying out a supplemental diagnostic according to a predetermined process when the generated average rate of change signal exceeds the predetermined signal threshold value.

2. The method of claim 1, further comprising the step of:

sensing a parameter indicating engine air/fuel ratio, wherein the signal cycles between rich and lean signal ranges as the engine air/fuel ratio cycles between rich and lean; and wherein the predetermined event indicating a start of a test period is a predetermined start of the signal cycle between rich and lean signal ranges and wherein the predetermined event indicating an end of the test period is a predetermined end of the signal cycle between rich and lean signal ranges.

3. The method of claim 1, wherein the supplemental diagnostic comprises the steps of:

generating the average rate of change signal for each of a plurality of vehicle operating cycles;

transforming the average rate of change signals by passing the signals through a predetermined slow filtering process to form a slow-filtered average value signal;

comparing the slow-filtered average value signal to a predetermined high signal threshold value;

indicating a catalytic treatment means failure when the slow-filtered average value signal exceeds the predetermined high signal threshold value;

transforming the average rate of change signals by passing the signals through a predetermined fast filtering process to form a fast-filtered average value signal;

comparing the fast-filtered average value signal to a predetermined low signal threshold value; and when the fast-filtered average value signal does not exceed the low signal threshold value, (a) generating a count of the number of average rate of change signals that were combined to determine the fast-filtered average value signal, (b) comparing the count to a count threshold, and (c) removing the indication of a catalytic treatment means failure when the count exceeds the count threshold.

4. The method of claim 3, wherein the predetermined slow filtering process includes passing the average rate of change signals through a lag filter having a predetermined high filter coefficient, and wherein the predetermined high filter coefficient and the predetermined high signal threshold value are determined in accord with the exponentially weighted moving average process.

5. The method of claim 3, wherein the predetermined fast filtering process includes passing the average rate of change signals through a lag filter having a predetermined low filter coefficient, and wherein the predetermined low filter coefficient and the predetermined low signal threshold value are determined in accord with the exponentially weighted moving average process.

6. A method for diagnosing a fault condition in a catalytic treatment means for catalytically treating internal combustion engine emission passing through the catalytic treatment means, by transforming an oxygen content signal into a signal indicating oxygen storage and release capacity of the catalytic treatment means and by analyzing such signal, comprising the steps of:

periodically generating oxygen content signals by sampling an oxygen content of engine emissions that have passed through the catalytic treatment means;

transforming the oxygen content signal into the signal indicating oxygen storage and release capacity, by a (a) passing the signals through a differentiation process for estimating a rate of magnitude change between oxygen content signals; (b) grouping each of the differentiated signals into one of a plurality of test periods; (c) determining a maximum differentiation signal for each of the plurality of test periods; (d) generating an average signal value as a predetermined function of the determined maximum differentiation signals;

carrying out a stage one diagnostic by comparing the average signal value to a predetermined stage one threshold value;

carrying out a predetermined stage two diagnostic when the average signal value exceeds the predetermined stage one threshold value; and indicating a catalytic treatment means failure upon failing the stage two diagnostic.

7. The method of claim 6, further comprising the steps of:

sensing a value of a parameter indicative of actual engine air/fuel ratio;

diagnosing a rich air/fuel ratio condition when the value of the parameter is within a predetermined range of rich air/fuel ratio values;

diagnosing a lean air/fuel ratio condition when the value of the parameter is within a predetermined range of lean air/fuel ratio values;

monitoring the duration of cycles of the parameter value between diagnosed rich and lean air/fuel ratio conditions; and adjusting the test periods so that each test period spans a predetermined portion of a corresponding parameter value cycle duration.

8. The method of claim 6, further comprising the steps of:

estimating a level of catalytic activity present in the catalytic treatment means during each of the test periods;

comparing the estimated level to a threshold level of activity;

classifying a test period as an active test period if the estimated level for that test period is greater than the threshold level; and wherein the step of generating an average signal value generates an average signal value as a predetermined function of the determined maximum differentiation signals for those test periods classified as active test periods.

9. The method of claim 6, further comprising the steps of:

sensing, during each test period, engine operating parameters indicating a presence of a predetermined stable engine operating condition;

classifying a test period as a stable test period if the sensed parameters during that test period indicate a stable engine operating condition; and wherein the step of generating an average signal value generates an average signal value as a predetermined function of the determined maximum differentiation signals for those test periods classified as stable test periods.

10. The method of claim 6, wherein the step of carrying out a predetermined stage two diagnostic further comprises the steps of:

generating the average signal value for each of a series of vehicle operating cycles;

slow-filtering the average signal values by passing the average signal values through a lag filter having a predetermined high filter coefficient;

comparing the slow-filtered average signal value to a predetermined high signal threshold value;

failing the stage two diagnostic when the slow filtered average signal value exceeds the high signal threshold value;

fast filtering the average signal values by passing the average signal values through a lag filter having a predetermined low filter coefficient;

comparing the fast-filtered average signal value to a predetermined low signal threshold value;

comparing the number of series of vehicle operating cycles for which an average signal value was generated to a predetermined series threshold when the fast-filtered average signal value does not exceed the low signal threshold value; and overriding the indication of a catalytic treatment means failure when the number of series exceeds the predetermined series threshold.

11. The method of claim 10, wherein the predetermined high filter coefficient and the predetermined high signal threshold value are determined in accord with the exponentially weighted moving average process.

12. The method of claim 10, wherein the predetermined low filter coefficient and the predetermined low signal threshold value are determined in accord with the exponentially weighted moving average process.

* * * * *